US012809404B2

(12) United States Patent
Durkin

(10) Patent No.: US 12,809,404 B2
(45) Date of Patent: Nov. 24, 2026

(54) DAY TANK FUEL SUPPLY SYSTEM

(71) Applicant: William Durkin, Manchester, WA (US)

(72) Inventor: William Durkin, Manchester, WA (US)

( * ) Notice: Subject to any disclaimer, the term of this patent is extended or adjusted under 35 U.S.C. 154(b) by 91 days.

(21) Appl. No.: 18/663,401

(22) Filed: May 14, 2024

(65) Prior Publication Data

US 2025/0355451 A1 Nov. 20, 2025

(51) Int. Cl.

| | |
|---|---|
| ***G05D 9/12*** | (2006.01) |
| ***B01D 35/00*** | (2006.01) |
| ***B01D 35/027*** | (2006.01) |
| ***B01D 35/143*** | (2006.01) |
| ***B01D 35/147*** | (2006.01) |
| ***B01D 35/157*** | (2006.01) |
| ***G05D 9/04*** | (2006.01) |
| ***G08B 21/18*** | (2006.01) |

(52) U.S. Cl.

CPC ............. *G05D 9/04* (2013.01); *B01D 35/005* (2013.01); *B01D 35/027* (2013.01); *B01D 35/143* (2013.01); *B01D 35/147* (2013.01); *B01D 35/1573* (2013.01); *G08B 21/182* (2013.01); *B01D 2201/167* (2013.01); *G05D 9/12* (2013.01)

(58) Field of Classification Search

CPC .... G05D 9/04; G05D 9/00–12; G05D 11/005; G05D 11/008; B01D 35/005; B01D 35/027–0276; B01D 35/14–1573; B01D 2201/16–167; G08B 21/18

USPC ...... 137/565.34, 565.17, 565.3, 565.29, 558, 137/551, 391–399, 409–454, 94–101.31, 137/115.06, 140

See application file for complete search history.

(56) References Cited

U.S. PATENT DOCUMENTS

| | | | | | |
|---|---|---|---|---|---|
| 763,681 | A | * | 6/1904 | LeFebvre | F16N 39/06 184/6.24 |
| 1,686,475 | A | * | 10/1928 | Southgate | F04D 13/12 417/86 |
| 1,717,741 | A | * | 6/1929 | Skinner | B01D 35/18 123/196 A |
| 1,767,856 | A | * | 6/1930 | Nugent | B01D 35/14 210/95 |
| 2,254,850 | A | * | 9/1941 | Mallory | F02M 17/06 137/391 |
| 2,367,055 | A | * | 1/1945 | Baugh | F02M 37/04 417/189 |
| 2,724,433 | A | * | 11/1955 | Witherell | F23D 11/001 239/351 |

(Continued)

*Primary Examiner* — Craig J Price

(74) *Attorney, Agent, or Firm* — Edison Law Group, PLLC.

(57) ABSTRACT

A day tank fuel supply system for supplying fuel to a device from a day tank. A control panel to receive and send operating signals for the system. A first pump connected to the main fuel inlet adapted to pump fuel from a main tank. The pump connected to the control panel. A flow manifold connected to the pump to provide a first flow path and a second flow path for the fuel. A float control valve connected between the day tank and the flow manifold. A level probe connected to the day tank and the control panel. A filter manifold contained within the second flow path. A bypass check valve connected to the second flow check valve as part of the second flow path to allow the fuel to continue to flow through the system back to the main tank.

15 Claims, 5 Drawing Sheets

(56) References Cited

U.S. PATENT DOCUMENTS 3,325,428 A * 6/1967 Graver et al. ....... C08G 63/785 528/308
4,166,713 A * 9/1979 Debrey .................... G05D 9/12 417/63
4,621,593 A * 11/1986 Rao ......................... F02B 47/00 44/364
4,831,990 A * 5/1989 Tuckey ................ F02M 37/106 123/514
4,893,647 A * 1/1990 Tuckey ................ B60K 15/077 123/514
5,195,494 A * 3/1993 Tuckey .................. F02M 37/44 123/514
5,224,343 A 7/1993 Steenborg et al.
5,368,001 A * 11/1994 Roche ................ F02M 37/0088 137/587
5,398,659 A * 3/1995 Zimmerman ........ F02M 37/106 123/514
5,560,342 A * 10/1996 Fournier .............. F02M 37/106 123/509
5,623,907 A * 4/1997 Cotton ................... F02M 37/10 123/456
5,647,328 A * 7/1997 Fournier .............. F02M 37/106 137/574
5,647,329 A * 7/1997 Bucci ..................... F02M 37/50 123/509
5,743,239 A * 4/1998 Iwase ................... B60K 15/077 137/574
5,832,903 A 11/1998 White et al.
5,894,857 A * 4/1999 Takaki ................... F02M 37/20 123/514
5,979,485 A * 11/1999 Tuckey ............. F02M 37/0058 137/574
6,009,859 A * 1/2000 Roche .................... F02M 31/20 123/41.31
6,155,238 A * 12/2000 Briggs ................... F02M 37/50 123/457
6,208,913 B1 * 3/2001 Marshall .............. G05D 7/0676 700/266
6,213,726 B1 * 4/2001 Tuckey .................. F02M 37/44 417/199.1
6,260,543 B1 * 7/2001 Chih .................... F02M 37/106 137/574
6,371,153 B1 * 4/2002 Fischerkeller ......... B60K 15/00 123/514
6,792,966 B2 * 9/2004 Harvey ................. F02D 33/003 123/514
7,069,913 B1 * 7/2006 Crary ................... F02M 37/106 123/514
8,739,821 B2 * 6/2014 Murabayashi ....... B60K 15/077 137/448
9,038,657 B2 5/2015 Wilkinson et al.
9,371,774 B2 * 6/2016 Lescure ................. F02M 37/32
10,087,084 B2 * 10/2018 DeMyer .................... C02F 1/78
10,408,143 B2 * 9/2019 Dudar ................ F01M 13/0011
10,767,599 B2 * 9/2020 Dudar ................. F02D 41/2464
11,022,124 B2 * 6/2021 Ward .................... E04B 1/7023
11,225,934 B2 * 1/2022 Steinman ........... F02M 25/0836
11,530,658 B1 * 12/2022 Dudar ................. F02D 41/0032
11,761,394 B2 * 9/2023 Dudar ................ F02M 25/0872 123/519
2001/0014840 A1 * 8/2001 Marshall .............. G05D 11/132 700/266
2003/0089650 A1 * 5/2003 Renfro ................. B01D 17/005 210/130
2008/0233437 A1 * 9/2008 Muramatsu ....... H01M 8/04365 429/410
2012/0097586 A1 * 4/2012 Heinz ..................... F23K 5/147 210/172.6

* cited by examiner

DAY TANK FUEL SUPPLY SYSTEM

BACKGROUND

The present invention generally relates to the resupply of fuel to a day tank. More specifically, the present invention relates a resupply of fuel to a day tank that fuels a generator.

The traditional day tank systems provide a fuel supply from bulk or main tank to a day tank in order to supply fuel to a diesel-powered emergency generator. Traditional day tank systems utilize an industry standard electrical infrastructure. Traditional day tank systems rely on the generators fuel consumption to draw down the fuel level in the day tank. As fuel level lowers, an electrical switch is actuated and it is then communicated to a control panel to energize a relay that operates a fuel oil supply inlet valve and sends a signal for a fill pump to start. The fuel oil supply inlet valve is typically a solenoid or motor operated ball valve. As the level fills in the day tank, another switch is actuated and the process is reversed. If the switches fail, there are backup switches that are deployed.

It is an object of the present invention to provide a day tank fuel supply system that overcomes the deficiencies of traditional systems currently employed.

SUMMARY

A day tank fuel supply system for supplying fuel to a device from a day tank. A control panel to receive and send operating signals for the system. A first pump connected to the main fuel inlet adapted to pump fuel from a main tank. The pump connected to the control panel. A flow manifold connected to the pump to provide a first flow path and a second flow path for the fuel. A float control valve connected between the day tank and the flow manifold. A level probe connected to the day tank and the control panel. A filter manifold contained within the second flow path. A bypass check valve connected to the second flow check valve as part of the second flow path to allow the fuel to continue to flow through the system back to the main tank.

DETAILED DESCRIPTION

The day tank fuel supply system is a steady state system designed to replace the role of a traditional day tank systems that provides a fuel supply to a diesel-powered emergency generator. The day tank fuel supply system is used in generator fuel supply systems that include a bulk or main storage tank. The day tank fuel supply system maintains a constant supply of fuel to a generator and through the system, when used in conjunction with a main tank fuel storage. Where the main tank fuel storage requires a fuel supply pump to move the fuel from the main tank to the day tank as fuel from the day tank is consumed by the generator. The day tank fuel supply system maintains the fuel supply without the need for the industry standard electrical infrastructure. The day tank fuel supply system differentiates itself from a traditional day tank in several ways. The day tank fuel supply system maintains fuel level in the day tank without the need for electrically actuated valves (solenoid or motorized ball valve) or an electrically actuated level switch. The day tank fuel supply system minimizes the start/stop cycles of fuel supply pumps & associated electrical valves which creates unwanted wear and tear on equipment. The day tank fuel supply system does not rely on a level switch to create a fill cycle on the day tank. The day tank fuel supply system operates under the principal that once an emergency generator starts, the fuel supply system should start and run concurrently with the generator. This principal minimizes the potential for equipment failure that typically occurs during a change in state (start/stop). The day tank fuel supply system supplies fuel to the day tank via a mechanical float valve. The float valve only opens to top off the day tank as fuel is consumed from the generator. When the float valve closes, the fuel is bypassed and circulates through the system on the way back to the main tank for storage. The day tank fuel supply system uses the bypassed fuel to filter fuel from the main tank and exchange heat with fuel returning from the generator, in order to keep the fuel supply to the generator within an appropriate temperature range. The day tank fuel supply system minimizes fuel system complexity, and installation/maintenance costs. The day tank fuel supply system serves two traditional fuel system functions (fuel supply and filtration) with one system. This limits the required day tank size, infrastructure, maintenance and energy consumption required. It also limits the complexity associated with multiple systems.

Figure 1:
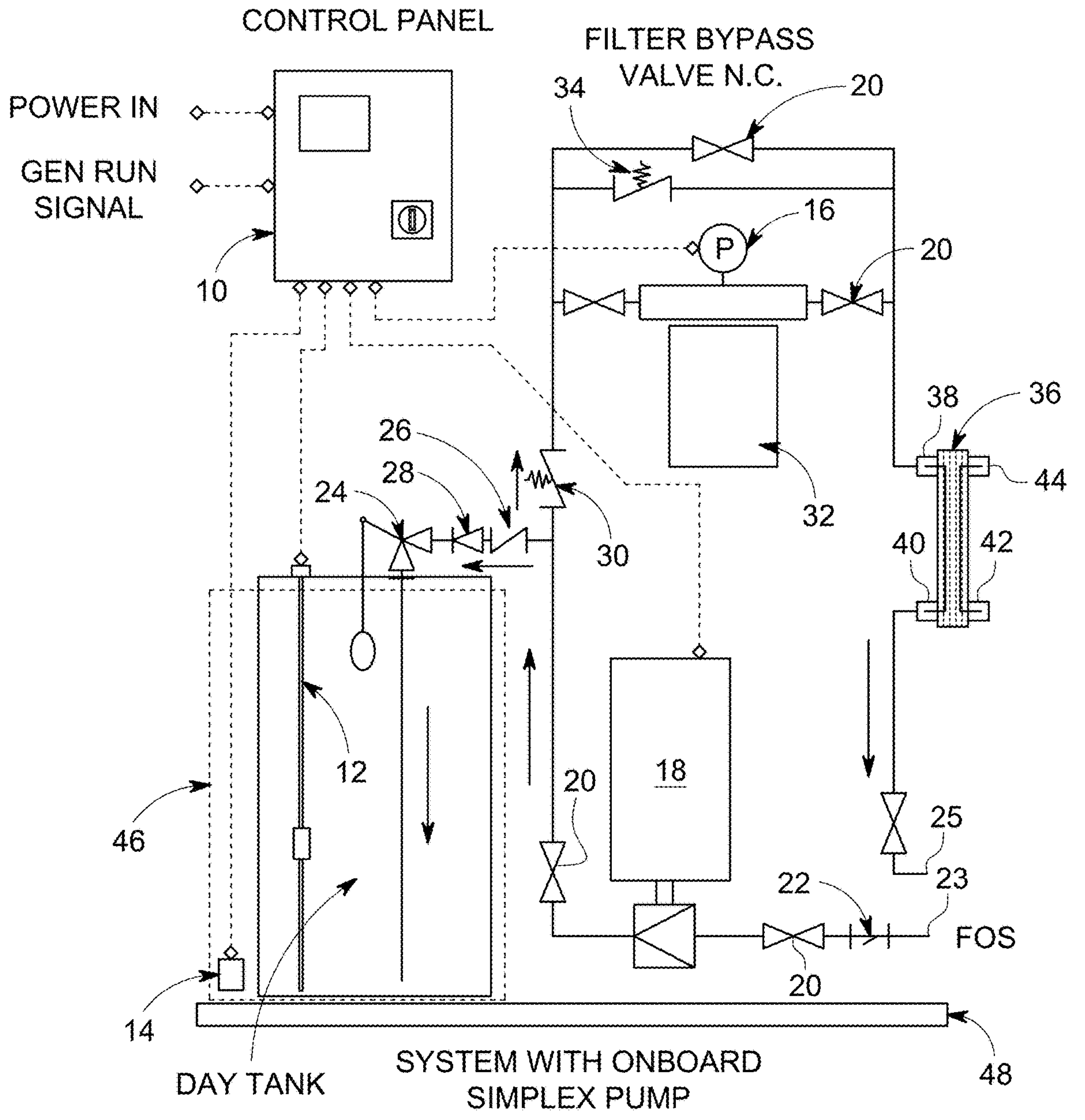
FIG. 1 is a schematic view of a first embodiment of a day tank fuel supply system according to the present invention.
Figure 2:
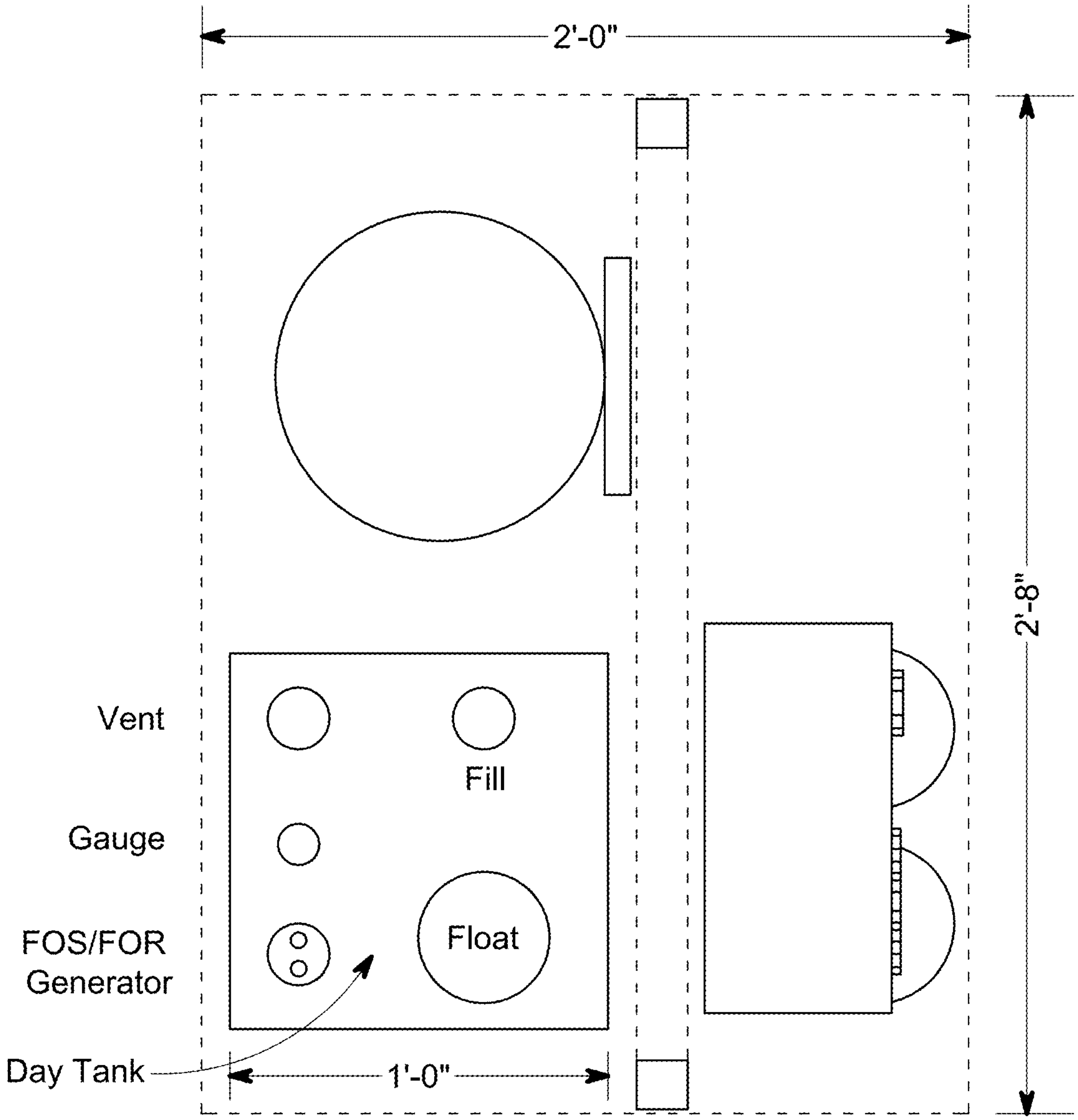
FIG. 2 is a top plan schematic view of the day tank fuel supply system according to the present invention.
Figure 3:
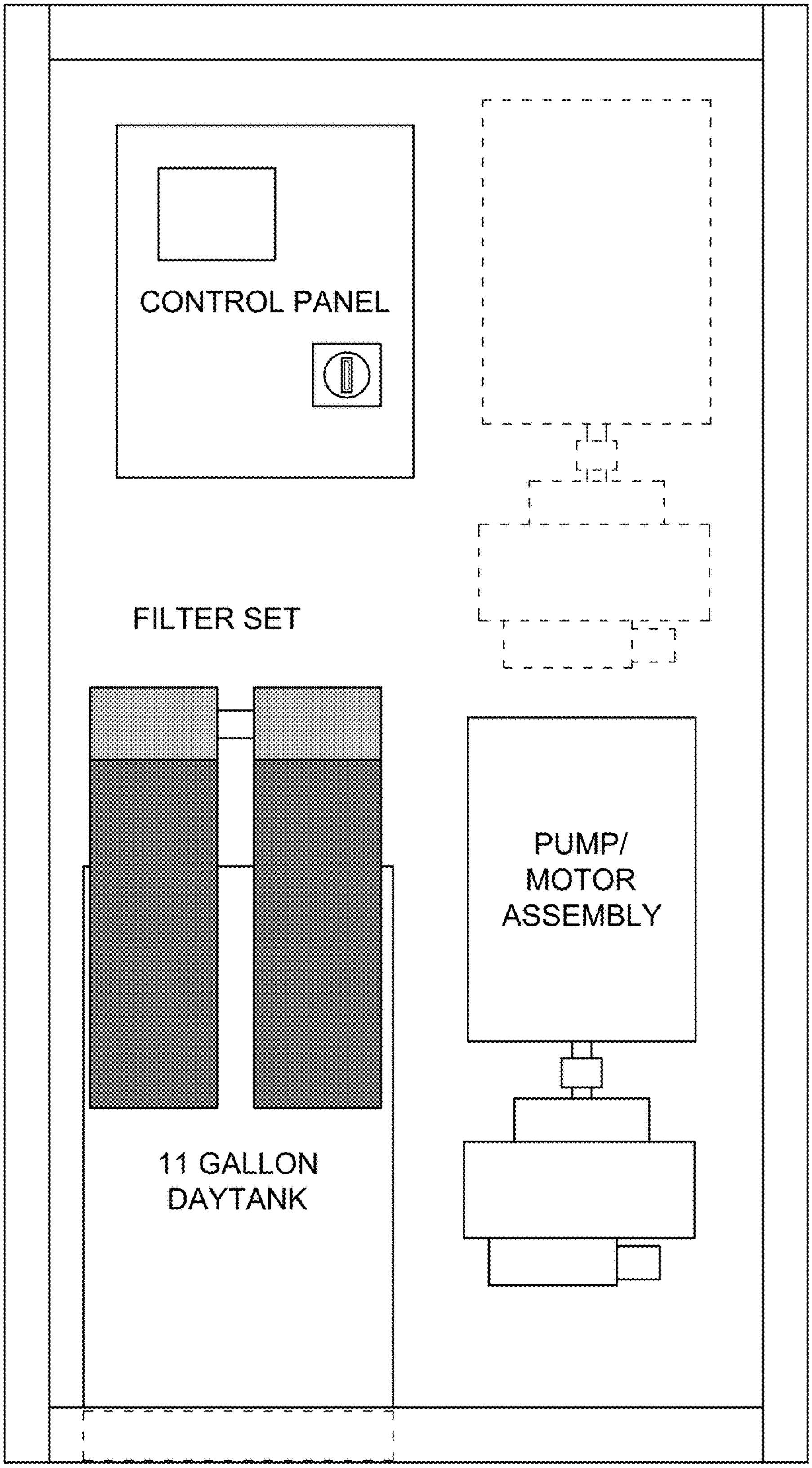
FIG. 3 is a elevation plan schematic view of the day tank fuel supply system according to the present invention.
Figure 4:
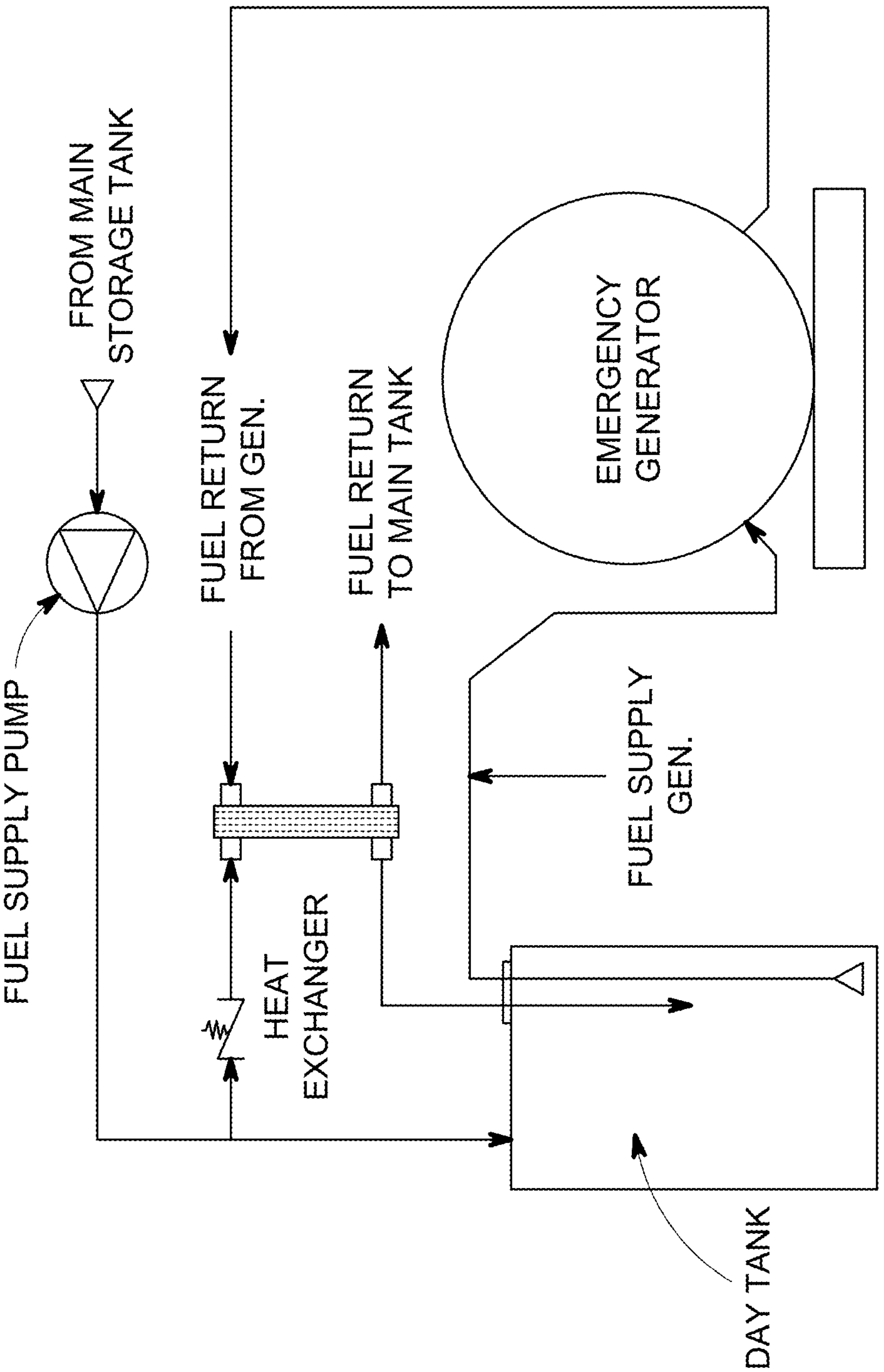
FIG. 4 is a schematic view of fuel flow through the day tank fuel supply system according to the present invention.

FIGS. 1-4 schematically show a first embodiment of the day tank fuel supply system utilizing a simplex fuel supply pump. The day tank fuel supply system allows for a smaller capacity fuel tank. The day tank fuel supply system provides a system that is constantly circulating fuel in the system to provide fuel to the day tank. FIG. 1 shows schematic of the entire day tank fuel supply system. FIG. 2 shows a top plan schematic view. FIG. 3 shows an elevation plan schematic view. FIG. 4 shows a schematic of fuel flow through the day tank fuel supply system. FIG. 1 shows a control panel 10 that is a PLC based with a touchscreen interface. Power required for the day tank fuel supply system is 20 amp, 115/208-230 VAC single phase. Input signals to the control panel 10 will be from the generator, day tank level probe 12, leak switch 14 and differential pressure switch 16. The signal from the generator will be a gen run signal. An output signal from the control panel 10 will energize the fuel supply pump 18. Isolation valves 20 are used throughout the system and are considered normally open and only closed for maintenance purposes. If a valve 20 is normally closed during operation, the valve 20 is marked N.C. on FIG. 1. The fuel oil flow path schematic of FIG. 4 is provided to illustrate the flow of fuel from day tank to and from the generator, as well as the cooling circuit for the generator fuel oil return.

As the generator comes online, the gen run signal will be received at the control panel from the generator controls of the generator. The control panel 10 receives operating status signals from the generator. The gen run signal input will create a start signal from the control panel 10 to the fuel supply pump 18 and the fuel supply pump 18 will start. The fuel supply pump 18 will draw fuel from the main tank and pressurize the inlet piping to the day tank. Fuel entering the system from the main tank at fuel oil supply (FOS) is the main fuel inlet. The fuel entering the main fuel inlet 23 is strained when passing through the fuel inlet strainer 22. The fuel then passes through the inlet isolation valve 20 and enters the inlet side of the positive displacement fuel pump 18. The fuel will become pressurized and exit the pump outlet side of the fuel pump 18 and on through the discharge isolation valve 20. The fuel enters a flow manifold and flows in two directions. The first flow path of the fuel is connected to a day tank inlet to fill the day tank, if the float control valve 24 is open. Whereby the float control valve 24 opens as the day tank empties and closes as the tank fills, keeping the day tank filled with a ready fuel supply for the generator. Fuel entering the day tank via the flow manifold will first pass through a one way flow control check valve 26 and then through a flow restrictor 28 and finally pass through the float control valve 24 before entering the day tank. Once the day tank has been filled, the float control valve 24 is closed. The second flow path is where fuel circulates in the system by overcoming approximately 69 kPa (10 psi) of backpressure generated by the spring loaded check valve 30 and passes through the filter manifold 32. When passing through the filter manifold 32, fuel will be filtered for free water and particulate matter. As the filters in the filter manifold 32 clog, a differential pressure will be created across the manifold filter 32. If 138 kPa (20 psi) is reached on the differential pressure sensor 16 attached to the manifold filter 32, an alarm will occur notifying the operator that a filter change is required. If the differential pressure through the manifold filter 32 approaches 310 kPa (45 psi), the spring-loaded bypass check valve 34 will open allowing fuel to continue to flow through the system back to the main tank. As fuel continues to flow back to the main tank via a main fuel outlet 25, the fuel will pass through a heat exchanger 36. The heat exchanger 36 includes a circulating fuel inlet 38 connected to circulating fuel outlet 40 to provide a cooling path through the heat exchanger 36. The heat exchanger 36 includes a return fuel inlet 42 connected to return fuel outlet 44 to provide a heated path for the fuel returning from the generator. Fuel returning from the generator flows into the heat exchanger 36 and out of the heat exchanger 36 to the day tank via the heated path. In the heat exchanger, heated fuel returning from the generator will be cooled by the relatively cooler fuel passing through cooling path from the system back to main fuel outlet 25 connected to the main tank, minimizing temperature gain in the day tank. If the day tank develops a leak or an overflow occurs, the containment basin 46 will contain the fuel and the leak sensor 14 will trip sending a signal to the control panel 10. The drip basin 48 is designed to catch any drips from filter changes etc. The system is designed to run continuously while the generator is running. The day tank fuel supply system can also run as needed to filter fuel from the main tank on a predetermined schedule, regardless of the status of the generator.

Figure 5:
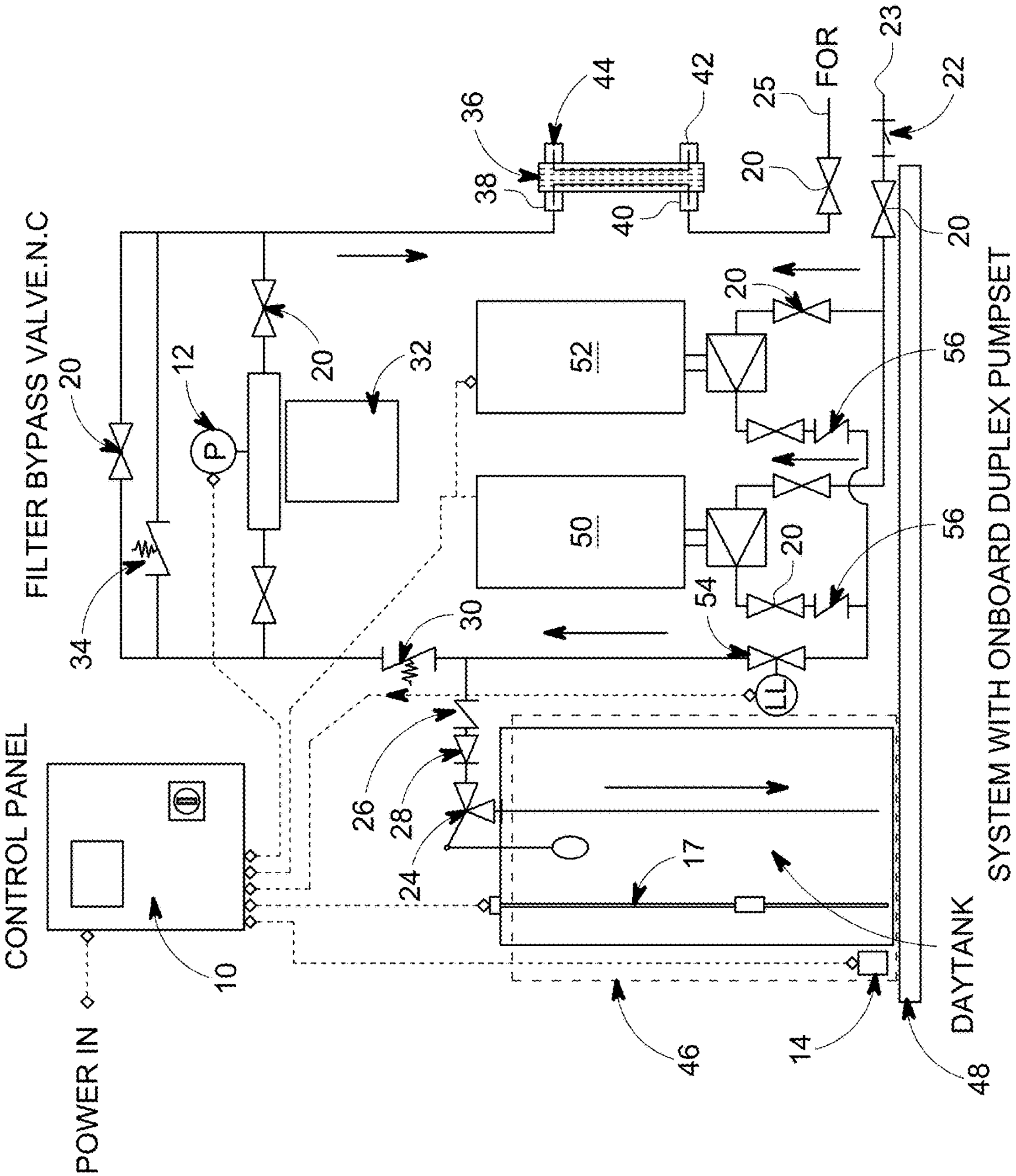
FIG. 5 is a schematic view of a second embodiment of a day tank fuel supply system according to the present invention.

FIG. 5 shows a second embodiment of the day tank fuel supply system utilizing a duplex fuel supply of a first fuel pump 50 and a second fuel pump 52. FIGS. 2-4 also apply to the second embodiment of FIG. 5, just with the additional of a second fuel supply pump. The operation of the duplex pump package in embodiment 2 is the same as the simplex pump package in embodiment 1 with the following distinctions. In embodiment 2, the fuel pumps alternate in lead/lag fashion on the gen run signal with only one pump running at any point in time. The flow switch 54 provides verification to the control panel 10 that the requested fuel pump is running, and flow has been achieved. The pump flow control check valves 56 are placed on pump outlets to prevent backflow and a potential for short cycling the fuel. When the gen run signal is received from generator by the control panel 10, the chosen lead pump of pump 50 and pump 52 will start and flow should be confirmed via flow indication switch 54 after a 5 second interval. The control panel 10 receives operating status signals from the generator. If the flow is not confirmed, the control panel 10 will generate a pump failure alarm and start the non-lead pump of the two. If a valve is normally closed during operation, it is marked N.C. on FIG. 5.

As the generator of FIG. 5 comes online, a gen run signal will be received at the control panel 10 from the generator controls of the generator. The gen run input signal from the generator will create a start signal from the control panel 10 to the lead fuel supply pump and the lead pump will start. Fuel flow is confirmed via the flow indication switch 54. If fuel flow is not confirmed within 5 seconds, the lead pump is considered failed and lead pump start signal will be turned off and alarm is generated at control panel 10. The non-lead pump will start and if flow is not confirmed within 5 seconds, flow failure alarm will be generated, but non-lead pump start signal will remain energized. The fuel supply pump of the two that is operating will draw fuel from the main storage tank and pressurize the inlet piping to the day tank. Fuel entering the system at the main fuel inlet 23 from the main tank will be strained when passing through the fuel inlet strainer 22. After the strainer 22, the fuel will pass through the inlet isolation valve 20 and enter the inlet side of the positive displacement fuel pump that is in operation. The fuel will become pressurized and exit the pump outlet of the operating fuel pump an on through the discharge isolation valve 20. The fuel will then enter a flow manifold and flow in two directions. The first flow path fills the day tank at a day tank inlet, if the float control valve 24 is open. Float control valve 24 opens as the day tank empties and closes as the day tank fills, keeping the day tank filled with a ready fuel supply for the generator. Fuel entering the day tank via the flow manifold will pass through a one way flow control check valve 26, through a flow restrictor 28 and finally through the float control valve 24 before entering the day tank. Once the day tank has been filled, the float control valve 24 will close. The second flow path is where fuel circulates in the system by overcoming approximately 69 kPa (10 psi) of backpressure generated by the spring loaded check valve 30 and passes through the filter manifold 32. When passing through the filter manifold 32, fuel will be filtered for free water and particulate matter. As the filter manifold 32 filters clog, a differential pressure will be created across the filter manifold 32. If 138 kPa (20 psi) is reached on the differential pressure sensor 16, an alarm will occur notifying the operator that a filter change is required. If the pressure through the filter manifold 32 approaches 310 kPa (45 psi) the spring-loaded bypass check valve 34 will open allowing fuel to continue to flow through the system. As fuel continues flowing to the main fuel outlet 25, the fuel will pass through the heat exchanger 36. The heat exchanger 36 includes a circulating fuel inlet 38 connected to circulating fuel outlet 40 to provide a cooling path through the heat exchanger 36. The heat exchanger 36 includes a return fuel inlet 42 connected to return fuel outlet 44 to provide a heated path for the fuel returning from the generator. Fuel returning from the generator flows into the heat exchanger 36 and out of the heat exchanger 36 to the day tank via the heated path. In the heat exchanger 36, heated fuel returning from the generator will be cooled by the relatively cooler fuel passing through cooling path from the system back to the main fuel outlet 25, minimizing temperature gain in the day tank. If the day tank develops a leak or an overflow occurs, the containment basin 46 will contain the fuel and the leak sensor 14 will trip sending a signal to the control panel 10. Drip basin 48 is designed to catch any drips from filter changes etc. The day tank fuel supply system runs continuously while the generator is running. The day tank fuel supply system can also run as needed to filter fuel from the main tank on a predetermined schedule regardless of the status of the generator.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A day tank fuel supply system comprising:

a day tank adapted for supplying fuel to a device that requires fuel to operate, wherein said day tank requires a resupply of fuel from a main tank during operation of the device due to said day tank being a smaller capacity;

a control panel to receive and send operating signals for said system, said control panel adapted to receive operating status signals from the device;

a main fuel inlet adapted to receive fuel from the main tank;

a main fuel outlet adapted to act as a fuel return to the main tank;

a first pump connected to said main fuel inlet adapted to pump fuel from the main tank, said pump connected to said control panel, whereby said control panel sends a signal to said pump to operate based on a signal from the device to the control panel that the device is operating;

a pump outlet to supply the fuel from the main tank to said system using said pump;

a flow manifold connected to said pump outlet to provide a first flow path and a second flow path for the fuel within said system, said flow manifold having a first flow outlet that creates said first flow path;

a float control valve connected between said day tank and said first flow outlet of said manifold, wherein when said float control valve is open, the fuel is supplied to said day tank, whereby said float control valve opens as said day tank empties and closes when said day tank fills to keep said day tank filled in order to supply fuel supply to the device;

a level probe connected between said day tank and said control panel to signal the fuel level in said day tank to said control panel and have said float control valve closed when said day tank is full and open when said day tank requires the resupply of fuel;

a second flow check valve connected to said manifold in said second flow path which allows the fuel to pass and circulate through said system;

a filter manifold connected in said second flow path between said second flow check valve and said main fuel outlet, said filter manifold adapted to filter free water and particulate matter from the fuel; and a bypass check valve connected to said second flow check valve as part of said second flow path which opens if said filter manifold is clogged and is adapted to allow the fuel to continue to flow through said system back to the main tank via said main fuel outlet.

2. The system of claim 1, further including a heat exchanger adapted to cool heated fuel returning from the device by using cooler fuel passing through from the system back to the main tank in order to minimize temperature gain in said day tank, said heat exchanger including circulating fuel inlet connected to circulating fuel outlet to provide a cooling path for the cooler fuel, said heat exchanger having a return fuel inlet connected to return fuel outlet to provide a heated path for the fuel returning from the device, wherein said heat exchanger is adapted to cool fuel flowing along said heated path as fuel returns from the device and wherein said return fuel outlet is connected to said main fuel outlet.

3. The system of claim 1, further including a leak sensor connected to said control panel that detects leaks from said day tank, said leak sensor providing a signal to said control panel; and further including a containment basin to adapted to contain fuel if there is a fuel overflow from said day tank.

4. The system of claim 1, further including a drip basin adapted to catch any drips from fuel overflows from said system.

5. The system of claim 1, further including a one way flow control check valve and a flow restrictor between said float control valve and said first flow outlet of said flow manifold.

6. The system of claim 1, wherein said second flow check valve is spring loaded and requires at least 10 psi of backpressure to allow the fuel to pass along said second flow path.

7. The system of claim 1, further including a differential pressure sensor connected between said filter manifold and said control panel to sound an alarm if the differential pressure is too high to notify a filter in said filter manifold needs to be replaced.

8. The system of claim 1, further including a second first pump connected to said main fuel inlet adapted to pump fuel from the main tank, said pump connected to said control panel, whereby said control panel sends a signal to either said first pump or said second pump to operate based on a signal from the device to the control panel that the device is operating.

9. The system of claim 8, further including a heat exchanger adapted to cool heated fuel returning from the device by cooler fuel passing through from the system back to the main tank in order to minimize temperature gain in said day tank, said heat exchanger including circulating fuel inlet connected to circulating fuel outlet to provide a cooling path for the cooler fuel, said heat exchanger having a return fuel inlet connected to return fuel outlet to provide a heated path for the fuel returning from the device, wherein said heat exchanger is adapted to cool fuel in said heated path as fuel returns from the device and wherein said return fuel outlet is connected to said main fuel outlet.

10. The system of claim 8, further including a leak sensor connected to said control panel that detects leaks from said day tank, said leak sensor providing a signal to said control panel; and further including a containment basin to adapted to contain fuel if there is a fuel overflow from said day tank.

11. The system of claim 8, further including a drip basin adapted to catch any drips from fuel overflows from said system.

12. The system of claim 8, further including a one way flow control check valve and a flow restrictor between said float control valve and said first flow outlet of said flow manifold.

13. The system of claim 8, wherein said second flow check valve is spring loaded and requires at least 10 psi of backpressure to allow the fuel to pass along said second flow path.

14. The system of claim 8, further including a differential pressure sensor connected between said filter manifold and said control panel to sound an alarm if the differential pressure is too high to notify a filter in said filter manifold needs to be replaced.

15. The system of claim 8, further including a pump flow control check valve at a pump outlet of each of said pumps.

* * * * *